UnitedStates Patent Office  2,972,545
Patented Feb. 21, 1961

2,972,545
DRESSING COMPOSITION
Joseph Briskin, Easton, Pa., assignor to Johnson & Johnson, a corporation of New Jersey
No Drawing. Filed Sept. 11, 1957, Ser. No. 683,220
19 Claims. (Cl. 106—177)

The present invention relates to a dressing composition for the treatment of wounds and the like and, more particularly, to film dressings of cellulose acetate-butyrate polymers.

It has heretofore been proposed to use thin polymer sheets or films for the protection of wounds through the application of the film over the wound surface. It has also been proposed to apply such dressings as preformed films or as solutions of the film-forming polymer which are applied by painting or by spraying. Any film dressing so formed should be innocuous to the wound to which it is applied, conform to the skin surface, be flexible enough to permit movement of the injured member without hindrance, have good skin adhesion and good coherence (coherence, as used in the present sense, meaning freedom from splitting). It is also highly desirable that the film have a high moisture transmission rate to permit some wound excretion to pass through the same and evaporation of moisture from the covered surface.

Since one of the most convenient methods of applying film dressings is through spraying, it is particularly desirable that the film-forming composition be compatible with the conventional aerosol propellants and adapt itself to the formation of readily sprayable solutions.

It is an object of the present invention to prepare a film-forming composition that can readily be applied as a preformed film or as a solution by either brush or aerosol spray application. It is also an object to prepare film-forming compositions that are readily soluble in the conventional fluoro-chloro hydrocarbon propellants. It is a further object to prepare film dressings that have high moisture transmission rates and excellent adhesion to skin surfaces and good coherence or freedom from film splitting. It is a still further object to prepare sprayable aerosol compositions that will deposit film dressings having high moisture transmission rates and excellent adhesion and coherence characteristics.

It has been found that these and other objects and advantages are obtained by using, as the film-forming composition, plasticized mixed cellulose acetate-butyrate ester polymers in which the plasticizer content, based on the sum of plasticizer and polymer, is 40 to 80% by weight and in which the polymerized mixed cellulose ester has an acetyl content of about 4 to 16% by weight, a butyryl content of about 30 to 50% by weight, and a viscosity, prior to plasticizing, of at least 3 seconds at 20° C. The viscosity is determined by ASTM method D–1343–54T in the solution described as Formula A, ASTM method D–871–54T. This method is described in Example 1.

Although any plasticizer may be used that is compatible with the cellulose mixed esters and is innocuous to the wound, the preferred plasticizers are di-n-butyl phthalate, tri-n-butyl citrate and 2-ethylhexyl di-phenyl phosphate. Plasticizer 2-ethylhexyl di-phenyl phosphate is presently commercially available under the trade name "Santicizer 141." The effect of plasticizer content on the adhesive and cohesive characteristics of sprayed film dressings is illustrated by the following table. It will be noted that the best results are obtained when the plasticizer content is within the range of about 60 to 70% based on the sum of the plasticizer and polymer, these being the preferred limits. With the plasticizer content of over 80%, the film formed is too tacky for use as a dressing.

| Plasticizer, Percent Santicizer 141 | Spray | Drying Rate | Adhesion to Skin, Percent After 24 Hrs. | Cohesive Strength, Percent |
|---|---|---|---|---|
| 40 | Fair | Very Good | 34 | 70 |
| 60 | Very Good | Good | 95 | 100 |
| 70 | Excellent | Fair | 93 | 95 |

The plasticized cellulose acetate-butyrate polymer is blended with any suitable solvent such as acetone to form a solution of the plasticizer. The dressing may then be precast in the form of a film which can be applied over the wound surface, or the film dressing can be formed on the wound surface by daubing or painting the polymer solution on the surface being treated and then letting the solvent evaporate or by spraying the solution onto the wound surface.

When applied to the wound surface in the form of a precast film, the adherence of the film to the skin can be substantially improved by activating the plasticized polymer film with ethanol. This may be done either by wetting the film directly with ethanol or by wetting the skin surface with ethanol immediately prior to application of the film dressing.

In the preferred practice of the present invention, the polymer film is applied by spraying. The sprayability of the polymer is dependent on its ability to form a finely atomized spray, which is related in turn to compatibility of the propellant with the solution being sprayed. Also, the rate of film drying is important, particularly when the dressing is applied by spraying. This is dependent primarily on the solvent used for the polymer. For spray application, it has been found that the best results are obtained if the solids (plasticized polymer) concentration of the polymer solution, i.e., the solution of plasticized polymer prior to blending with a propellant, does not exceed about 25%, although concentrations up to 30% may be used. Solutions having a solids concentration of less than 10% tend to build up a film too slowly for practical dressing use and are therefore generally not desirable. The solids concentration should, therefore, be somewhere within the range of about 10 to 30% for spray application. The preferred compositions for spraying contain about 15 to 25% plasticized cellulose acetate-butyrate polymer in the polymer solution. Although the cellulose acetate-butyrate polymers are soluble in many solvents, the best results are obtained when the solvent has a boiling point within the range of about 45 to 80° C. If the solvent evaporates too rapidly, blistering of the film will result, whereas, if the solvent evaporates too slowly, the film remains tacky for too long a period. The best results are obtained by using as the solvent methyl acetate, ethyl acetate, acetone or mixtures thereof.

It has been found that the viscosity of the cellulose acetate-butyrate polymers, which is dependent on the molecular weight and acetyl and butyryl content, is important with respect to obtaining a satisfactory film dressing. Thus, a cellulose acetate-butyrate polymer having an acetyl content of 13%, a butyryl content of 37% and a viscosity of about 0.5 second failed to give films sufficiently free from splitting, when applied to skin, to be suitable for forming satisfactory film dressings. However, polymers having the same acetyl and butyryl content but polymerized to the point where they had a viscosity at 20° C. of about 20 seconds gave excellent films which were substantially free from any splitting and formed excellent film dressings.

As previously stated, the cellulose acetate-butyrate polymer used should have a viscosity, prior to plasticizing, of at least 3 seconds at 20° C. If the polymer is used in a spray formulation, the viscosity prior to plasticizing should generally not exceed about 40 seconds. Satisfactory films can be obtained by blending otherwise unsatisfactory cellulose acetate-butyrate polymers with higher or lower molecular weight polymers to obtain polymers within this viscosity range. Thus, satisfactory polymer compositions are obtained by blending a 0.5-second viscosity cellulose acetate-butyrate polymer, which by itself is unsatisfactory, with a 20-second viscosity cellulose acetate-butyrate polymer in proportions wherein the lower viscosity polymer was varied from 25 to 50% by weight of the total blend.

In preparing the sprayable compositions of the present invention, the cellulose acetate-butyrate ester is first mixed with the plasticizer, then blended with the solvent until a clear solution is obtained. This solution is mixed with an aerosol propellant of the conventional type, such as a mixture of liquified trichloromonofluoromethane and liquified dichlorodifluoromethane. These are generally, although not necessarily, used in equal proportions. The invention, however, is not limited to the use of these particular proportions or to these particular propellants since any of the propellant mixtures generally found suitable for aerosol spraying are believed to be satisfactory.

Although the proportion of polymer solution and propellant can be substantially varied, the aerosol composition should not contain less than about 50% by weight propellants. It is generally preferred, and the best results are obtained, when the total polymer solution is about 25 to 40% of the aerosol composition, the remainder being propellant. On a plasticized polymer solids basis, this would be about 2.5 to 10% by weight solids, 36 to 19% by weight solvent other than propellants, and 60 to 75% by weight propellants. The solution of liquified propellant and polymer, i.e., the aerosol composition, may be placed in any conventional aerosol-type container equipped with a spray valve. In applying the dressing, the spray is directed onto the surface to be coated and one or more thin coats applied with intermittent drying at room temperature until a film of the desired thickness is obtained.

If desired, disinfectants, antiseptics, analgesics, antibiotics or other medicaments may be incorporated into the film dressing by dissolving or suspending them in the solution of the plasticized mixed cellulose ester polymer. When this is done, the film when finally formed will contain the medicament and maintain the same in close contact with the wound surface.

The following examples further illustrate the practice of the invention. These examples are given for purposes of illustration only and the invention is not intended to be limited thereby.

*Example 1*

In an agitator equipped vessel there were mixed 40 parts by weight of a cellulose acetate-butyrate ester, 60 parts by weight of 2-ethylhexyl di-phenyl phosphate and 400 parts by weight of acetone. Mixing was continued until a clear solution was obtained. The cellulose acetate-butyrate used had an acetyl content of 13%, a butyryl content of 37%, one free hydroxyl group for each four anhydroglucose units of the cellulose and a viscosity of 20 seconds as measured by the following procedure:

The example to be tested is dried overnight at 90° to 100° C. Four hundred grams of acetone containing 0.4±0.1 percent of water are added to 100 grams of dry cellulose ester in a one-quart bottle, which is then closed tightly and tumbled end over end for about twelve hours in a mechanical tumbling machine.

After the cellulose ester is thoroughly dissolved, the solution is poured into a glass cylinder 14 inches high, 1 5/16 inches in inside diameter, which has two graduations 10 inches apart. The upper is 2 inches from the top, and the lower, 2 inches from the bottom of the cylinder. The cylinder is stoppered and placed in a water bath maintained at 20° C. After the temperature of the cellulose ester solution has become constant and uniform and any bubbles have risen to the surface, the cylinder is placed in a glass-walled tank containing water at 20° C., in such a position that a ball falling through the solution will be visible throughout its passage down the column. A standard 5/16-inch steel ball bearing, diameter 0.793 to 0.797 cm. and weighing between 2.033 grams and 2.035 grams, is placed on the center of the top surface of the solution in the cylinder and allowed to fall through the solution. The time in seconds required for the steel ball to pass through the 10-inch column of the solution between the two graduations, as measured by a stop watch, is taken as the viscosity in seconds.

Thirty-three parts by weight of this solution was blended with 33.5 parts by weight of liquified trichloromonofluoromethane (Freon 11) and 33.5 parts by weight of liquified dichlorodifluoromethane (Freon 12). The acetone solution of the plasticized mixed cellulose ester was readily soluble in the Freon 11 and Freon 12, a complete solution being obtained. The resulting solution was sealed in a conventional aerosol type container adapted with a spray-type release valve.

The dressing solution was applied directly by spraying on 2½ x 3½-inch skin areas of 20 subjects, using three intermittent applications giving a film of 4 to 8 mils thickness. The film was clear, transparent, conformed to the skin surface and was flexible enough to permit ready movement without hindrance. The deposited film adhered tenaciously to the skin area covered. The films were left on the subject for 48 hours. At the end of 24 hours and at the end of the 48-hour period the films were examined for skin adhesion and coherence, coherence being the resistance to splitting. The results are given in the following table:

| Average Skin Adhesion, Percent | | Average Film Intactness or Coherence Percent | |
|---|---|---|---|
| 24 Hrs. | 48 Hrs. | 24 Hrs. | 48 Hrs. |
| 96.0 | 61.0 | 100 | 100 |

(Average skin adhesion is measured as the precentage of the original film which was still adhering to the subject. Average film intactness is measured as 100% for no splitting down to zero for severe splitting.)

*Example 2*

In order to test the moisture vapor transmission rate of the film dressings of the present invention, a solution, prepared as in Example 1, was cast on a 7 x 24-inch glass plate using a doctor blade to scrape off excess. The solution, upon drying at 25 to 30° C. for 30 minutes gave a uniform water-white film. The moisture vapor transmission rate of the film was determined by using the ASTM D–830–45T (100° F., 90% relative humidity) with the following results:

| Film Thickness, Mils | Moisture Vapor Transmission Rate, Grams/24 Hours/100 Sq. In. |
|---|---|
| 4.2 | 96.4 |
| 4.0 | 102 |
| 4.0 | 104 |

Example 3

A polymer solution was prepared in accordance with Example 1 except that the film-forming soltuion contained 50 parts of the cellulose mixed ester and 50 parts of 2-ethylhexyl di-phenyl phosephate plasticizer. Adhesion and coherence tests similar to that in Example 1 gave the following results:

| Adhesion, Percent | | Coherence, Percent | |
|---|---|---|---|
| 24 Hrs. | 48 Hrs. | 24 Hrs. | 48 Hrs. |
| 71.0 | 42.2 | 100 | 100 |

Example 4

Films using different plasticizers were made and tested in the manner described in Example 1. The best films, as shown by the following table, were obtained when using di-n-butyl phthalate, tri-n-butyl citrate and Santicizer 141 (2-ethylhexyl di-phenyl phosphate) as the plasticizer.

| Plasticized Polymer | Spray | Drying Rate | Adhesion to Skin | | Cohesive Strength, Percent |
|---|---|---|---|---|---|
| | | | 24 Hrs. | 48 Hrs. | |
| 50 parts di-n-butyl phthalate, 50 parts cellulose ester polymer. | Good | Good | 95 | 55 | 100 |
| 50 parts di-isobutyl adipate, 50 parts cellulose ester polymer. | Excellent | Very Good | 51 | 3 | 90 |
| 50 parts tri-n-butyl citrate, 50 parts cellulose ester polymer. | Good | do | 98 | 80 | 95 |
| 60 parts Paraplex G-50,[1] 40 parts cellulose ester polymer. | do | do | 66 | 1 | 100 |
| 60 parts Santicizer 141, 40 parts cellulose ester polymer. | do | do | 96 | 61 | 100 |

[1] Paraplex G-50 is a soft, viscous polyester resin made from propylene glycol and adipic acid, the chains being end-grouped with a monobasic carboxylic acid.

Example 5

A solution was prepared in accordance with Example 1, and 25 parts by weight of this solution were mixed with 25 parts by weight of trichloromonofluoromethane and 50 parts by weight of dichlorodifluoromethane. The resulting aerosol mixture was loaded into an aerosol can. The system gave a good spray of film former. The film formed was similar to that of Example 1.

Example 6

Following the procedure outlined in Example 1, aerosol dressing compositions were prepared using cellulose acetate-butyrate polymers having different viscosities and different proportions of acetyl and butyryl radicals. The following table illustrates the effect of acetyl and butyryl content and viscosity on the effectiveness of the dressing film as shown by adhesion and cohesion tests.

Variations and modifications will be apparent in view of the foregoing disclosure, and it is intended to include all such variations and modifications within the invention except as do not come within the scope of the appended claims.

Having thus described my invention, I claim:

1. A composition for forming film dressings, said composition consisting essentially of a cellulose acetate-butyrate polymer plasticized with 40 to 80% by weight plasticizer based on the total weight of the plasticizer and polymer, the polymer having an average viscosity prior to plasticizing of at least 3 seconds and an acetyl and butyryl content of 4 to 16% by weight acetyl radicals and 30 to 50% by weight butyryl radicals.

2. A dressing composition of claim 1 in which the plasticizer is present in amounts of 60 to 70% by weight based on the total weight of the plasticizer and polymer.

3. A dressing consisting essentially of a thin sheet of plasticized cellulose acetate-butyrate polymer containing 40 to 80% by weight plasticizer based on the total weight of plasticizer and polymer, the polymer having an average viscosity prior to plasticizing of at least 3 seconds and an acetyl and butyryl content of 4 to 16% by weight acetyl radicals and 30 to 50% by weight butyryl radicals.

4. A film-forming dressing solution comprising 10 to 30% by weight of a plasticized film-forming cellulose acetate-butyrate polymer and 90 to 70% by weight solvent for said polymer boiling within the temperature range of 45 to 80 C., said plasticized film-forming polymer consisting essentially of cellulose acetate-butyrate polymer containing 40 to 80% by weight plasticizer based on the total weight of plasticizer and polymer, the polymer having 4 to 16% by weight acetyl radicals, 30 to 50% by weight butyryl radicals and a viscosity prior to plasticizing of at least 3 seconds at 20° C., said solvent evaporating on application of said film forming dressing solution to the skin of a patient to leave on said skin a film dressing consisting essentially of said plasticized cellulose acetate-butyrate polymer.

| Viscosity Range,[1] Seconds | Average Acyl Content, percent | | Plasticizer, Santicizer 141,[2] percent | Spray | Drying Rate | Adhesion to Skin, percent | | Cohesive strength, percent |
|---|---|---|---|---|---|---|---|---|
| | Acetyl | Butyryl | | | | 24 Hrs. | 48 Hrs. | |
| 1.5-2.5 | 29.5 | 17 | 60 | Very Good | Very Good | 0 | 0 | 100 |
| 10.-21 | 29.5 | 17 | 60 | Good | do | 0 | 0 | 100 |
| 31-50 | 29.5 | 17 | 60 | Poor | do | 0 | 0 | 100 |
| 2.4-3.6 | 20.5 | 26 | 60 | Good | do | 12 | 0 | 80 |
| 15-35 | 20.5 | 26 | 60 | do | do | 7 | 0 | 100 |
| 0.3-0.5 | 13.0 | 37 | 50 | Excellent | Good | 25 | 0 | 0 |
| 17-33 | 13.0 | 37 | 60 | Fair | do | 94 | 59 | 99 |
| 0.8-1.2 | 6.0 | 48 | 50 | Excellent | do | 0 | 0 | 0 |
| 4.0-6.0 | 6.0 | 48 | 50 | Good | do | 89 | 44 | 65 |

[1] Viscosity is determined by A.S.T.M. method D-1343-54T in the solution described as Formula A, A.S.T.M. method D-871-54T.
[2] Based on the sum of cellulose acetate-butyrate and Santicizer 141.

All aerosols were formulated with a 20% solution in acetone. One part by weight of the solution was mixed with two parts of 50% Freon 11—50% Freon 12.

5. A film-forming solution of claim 4 wherein the plasticizer content is 60 to 70% based on the total weight of plasticizer and polymer.

6. A film-forming solution of claim 4 wherein said solvent is selected from the group consisting of methyl acetate, ethyl acetate, acetone and mixtures thereof.

7. A film-forming solution of claim 4 wherein said plasticizer is at least one of the group consisting of di-n-butyl phthalate, tri-n-butyl citrate and 2-ethylhexyl di-phenyl phosphate.

8. A solution of claim 7 in which the solvent is methyl acetate.

9. A solution of claim 7 in which the solvent is ethyl acetate.

10. A solution of claim 7 in which the solvent is acetone.

11. A film-forming composition suitable for blending with an aerosol propellant for spray application consisting essentially of 15 to 25% by weight of a plasticized cellulose acetate-butyrate polymer and 85 to 75% by weight of a solvent of the group consisting of methyl acetate, ethyl acetate, acetone and mixtures thereof, said plasticized polymer containing 60 to 70% by weight plasticizer based on the total weight of plasticizer and polymer, the plasticizer being at least one of the group consisting of di-n-butyl phthalate, tri-n-butyl citrate and 2-ethylhexyl di-phenyl phosphate, said polymer having 4 to 16% by weight acetyl radicals, 30 to 50% by weight butyryl radicals and a viscosity of 3 to 40 seconds at 20° C. prior to plasticizing.

12. An aerosol composition comprising a completely miscible mixture of a film-forming composition of claim 4 and a polyhalogenated lower alkane refrigerant propellant in which the propellant comprises at least 50% of the composition.

13. An aerosol composition comprising 60 to 75% by weight of a lower alkane refrigerant propellant and 40 to 25% by weight of a composition of claim 4.

14. An aerosol composition consisting essentially of 2.5 to 10% by weight of a plasticized cellulose acetate-butyrate polymer containing 40 to 80% by weight plasticizer based on the total weight of plasticizer and polymer, the polymer having an average viscosity prior to plasticizing of 3 to 40 seconds at 20° C., 19 to 36% by weight of a solvent boiling within the temperature range of 45 to 80° C. and 60 to 75% by weight of a polyhalogenated lower alkane refrigerant propellant.

15. An aerosol composition of claim 14 in which the propellant is selected from the group consisting of trichloromonofluoromethane, dichlorodifluoromethane and mixtures thereof.

16. A composition of claim 1 for forming film dressings in which the plasticizer is at least one of the group consisting of di-n-butyl phthalate, tri-n-butyl citrate and 2-ethylhexyl di-phenyl phosphate.

17. A composition of claim 1 for forming film dressings in which the plasticizer is di-n-butyl phthalate.

18. A composition of claim 1 for forming film dressings in which the plasticizer is tri-n-butyl citrate.

19. A composition of claim 1 for forming film dressings in which the plasticizer is 2-ethylhexyl di-phenyl phosphate.

References Cited in the file of this patent

UNITED STATES PATENTS

| | | |
|---|---|---|
| 2,186,454 | Gloor | Jan. 9, 1940 |
| 2,804,073 | Gallienne et al. | Aug. 27, 1957 |

OTHER REFERENCES

Fordyce et al.: Ind. and Eng. Chem., vol 32, No. 8, pp.1053–1060.

Ott: High Polymers, vol 5 (Cellulose and Cellulose Derivatives), 1943, page 1074.

Ott: High Polymers, vol. 5 (Cellulose and Cellulose Derivatives), 1954, pages 808, 809.